(12) United States Patent
Sykora

(10) Patent No.: US 12,451,827 B2
(45) Date of Patent: Oct. 21, 2025

(54) VARIABLE FREQUENCY DRIVE SYSTEM WITH MEDIUM VOLTAGE INPUT AND LOW VOLTAGE OUTPUT

(71) Applicant: Trane International Inc., Davidson, NC (US)

(72) Inventor: Benjamin J. Sykora, Stoddard, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 391 days.

(21) Appl. No.: 18/062,173

(22) Filed: Dec. 6, 2022

(65) Prior Publication Data

US 2024/0186930 A1    Jun. 6, 2024

(51) Int. Cl.
*H02P 23/04* (2006.01)
*H02P 25/18* (2006.01)
*H02P 27/06* (2006.01)

(52) U.S. Cl.
CPC ............ *H02P 23/04* (2013.01); *H02P 25/184* (2013.01); *H02P 27/06* (2013.01); *H02P 2201/01* (2013.01)

(58) Field of Classification Search
CPC ........ H02P 23/04; H02P 25/184; H02P 27/06; H02P 2201/01
See application file for complete search history.

(56) References Cited

U.S. PATENT DOCUMENTS

| | | | |
|---|---|---|---|
| 7,640,767 B2 | 1/2010 | Schnetzka | |
| 9,293,921 B2* | 3/2016 | Jones | H02M 7/493 |
| 2011/0051480 A1* | 3/2011 | Blanchery | H01F 30/02 |
| | | | 363/154 |
| 2015/0357946 A1 | 12/2015 | Farr | |
| 2022/0376613 A1* | 11/2022 | Britton | H02M 1/44 |
| 2023/0113753 A1* | 4/2023 | He | H02M 3/01 |
| | | | 363/13 |
| 2023/0386738 A1* | 11/2023 | Duan | H02M 5/10 |

* cited by examiner

*Primary Examiner* — Adolf D Berhane
(74) *Attorney, Agent, or Firm* — Womble Bond Dickinson (US) LLP

(57) ABSTRACT

According to an embodiment of the present disclosure, an apparatus includes a transformer having a set of input terminals, a first set of output terminals, and a second set of output terminals. First and second rectifiers are coupled to the first and second sets of output terminals, respectively. The transformer is configured to transform three phase alternating current (AC) provided to the set of input terminals into first and second three phase AC outputs at the first and second sets of output terminals, respectively. The first three phase AC output is phase shifted from the second three phase AC output.

20 Claims, 9 Drawing Sheets

VARIABLE FREQUENCY DRIVE SYSTEM WITH MEDIUM VOLTAGE INPUT AND LOW VOLTAGE OUTPUT

TECHNOLOGICAL FIELD

The present disclosure relates generally to an improved variable frequency drive system for controlling an electric motor that allows for a reduction in temporal harmonics.

BACKGROUND

An electric motor is a machine that converts electrical energy into mechanical energy. Most electric motors operate through an interaction between the motor's magnetic field and electric current in a wire winding to generate force in the form of torque applied on the motor's shaft. Electric motors may be classified by power source type, application, etc. Industrial applications include alternating current (AC) motors for HVACs, pumps, fans, etc.

Some AC motors operate at a fixed rotational speed, while others operate at variable rotational speeds. Variable-frequency drives (VFDs) are devices that can control the rotational speed of variable speed AC motors. VFDs can control the speed and torque of an AC motor by varying wire winding current frequency and, depending on topology, by controlling the magnitude of the current or associated voltage.

A VFD typically includes three distinct sub-systems: a rectifier, a direct current (DC) link, and an inverter. Rectifiers convert AC input power to DC power. The most basic rectifier for VFDs used in industrial applications is configured as a three-phase, full-wave diode bridge. The DC link consists of a capacitor which smooths out the DC power to the inverter. The inverter converts the DC input power into three-phase AC power that drives wire windings of the AC motor (e.g., three-phase induction motor).

Harmonic distortion is a measure of the amount of deviation from a pure sinusoidal wave form that can be caused by a non-linear load (a VFD is considered a non-linear load because the rectifier portion draws current in a non-sinusoidal pattern).

BRIEF SUMMARY

The following presents a summary to provide a basic understanding of one or more embodiments of the disclosure. This summary is not intended to identify key or critical elements or delineate any scope of the embodiments or any scope of the claims. Its sole purpose is to present concepts in a simplified form as a prelude to the more detailed description that is presented later.

According to an embodiment of the present disclosure, an apparatus includes a transformer having a set of input terminals, a first set of output terminals, and a second set of output terminals. First and second rectifiers are coupled to the first and second sets of output terminals, respectively. The transformer is configured to transform three phase alternating current (AC) provided to the set of input terminals into first and second three phase AC outputs at the first and second sets of output terminals, respectively. The first three phase AC output is phase shifted from the second three phase AC output. The apparatus can further include a third rectifier, and the transformer can include a third set of output terminals coupled to the third rectifier. The transformer can be configured to transform the three phase alternating current AC provided to the set of input terminals into the first three phase AC output at the first set of output terminals, the second three phase AC output at the second set of output terminals, and a third three phase AC output at the third set of output terminals. The first three phase AC output may lead the second three phase AC output, and the third three phase AC output may lag the second three phase AC output. The apparatus may further include first, second, and third inverters coupled to the first, second, and third rectifiers, respectively. The transformer may include a set of primary windings in addition to first, second, and third sets of secondary windings. The first and third sets, but not the second set, of secondary windings can be arranged in a zigzag configuration. For example, each of the first and third sets of secondary windings can be arranged in a delta zigzag configuration.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE DRAWINGS

For a detailed description of various exemplary embodiments, reference will now be made to the accompanying drawings in which.

The use of the same reference symbols in different figures indicates similar or identical items.

DETAILED DESCRIPTION

Figure 1:
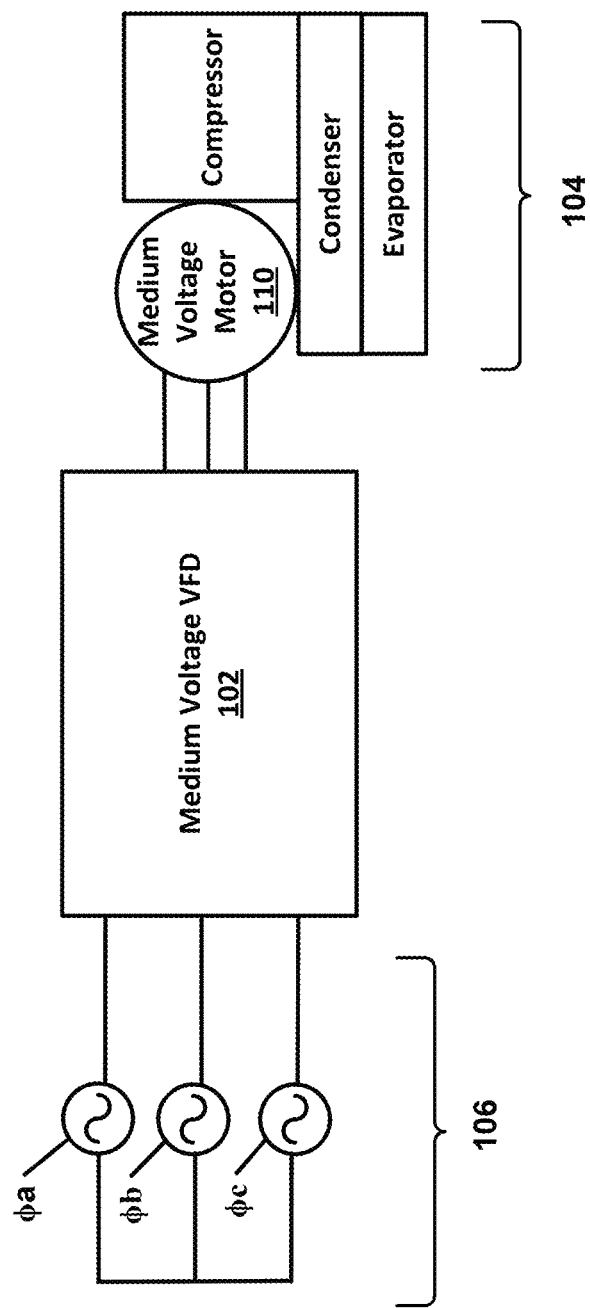
FIG. 1 illustrates a medium-voltage electric motor that is controlled by a medium-voltage variable frequency drive.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. Further, when used herein (including in the claims), the words "about," "generally," "substantially," "approximately," and the like mean within a range of plus or minus 10% unless otherwise stated herein.

FIG. 1 illustrates a medium voltage VFD 102 coupled between an industrial HVAC system 104 and a three-phase medium voltage feed 106. HVAC system 104 includes a three-phase medium voltage AC motor 110 electrically connected to and controlled by three-phase medium voltage VFD 106.

Three-phase medium voltage VFDs are expensive to make. In addition, three-phase medium voltage VFDs are large, which makes them hard to build and ship to a customer. The market for three-phase medium voltage VFDs is diverse and includes many (e.g., 14+) unique voltage ratings, and many (e.g., 11+) unique power ratings. Accordingly, VFD suppliers are often required to provide three-phase medium voltage VFDs in multiple configurations to meet diverse market demands, which can be challenging from a manufacturing standpoint.

Some the problems associated with three-phase medium voltage VFDs can be alleviated if customers of VFD manufacturers employ standard low-voltage AC motors instead of medium-voltage AC motors. However, the use of three phase low voltage (e.g., 480 V) AC motors is not directly compatible with the full range of customer feeder voltages. Low voltage may be considered as less than 690V.

Figure 2:
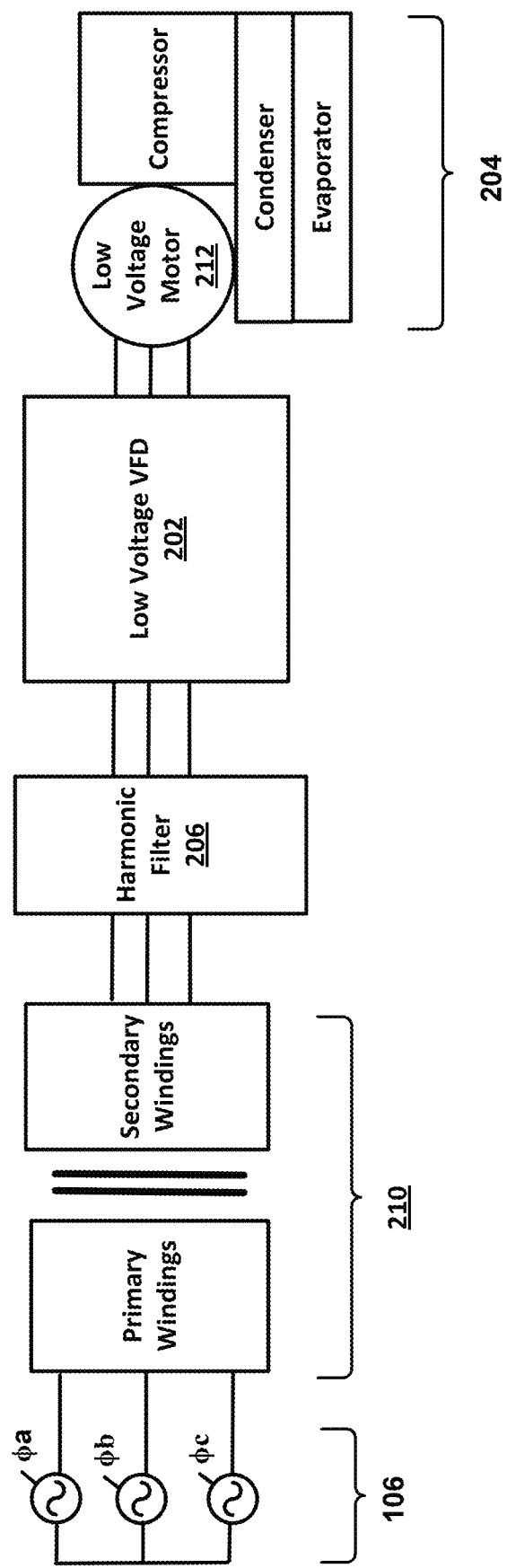
FIG. 2 illustrates a low-voltage electric motor that is controlled by a low voltage variable-frequency drive.

FIG. 2 illustrates a three-phase low-voltage VFD 202 coupled between HVAC system 204 and a harmonic filter 206. HVAC system 204 includes a three-phase low-voltage AC motor 212. FIG. 2 also includes a three-phase step-down transformer 210, which transforms a three-phase medium-voltage input provided by three-phase medium voltage feed 106 into a three-phase low-voltage output that is needed by low-voltage VFD 202 and/or low-voltage AC motor 212.

Even though it is low-voltage, AC motor 212 may need more current than that required by the medium-voltage motor AC 110 shown in FIG. 1 to provide the same power to compressor of HVAC system 204. VFDs create harmonic distortion. High current, low-voltage VFDs can create substantial harmonic distortion. Harmonic filter 206 is added to mitigate the harmonic distortion of VFD 202. However, harmonic filter 206 adds complexity and cost to the system shown in FIG. 2.

Figure 3:
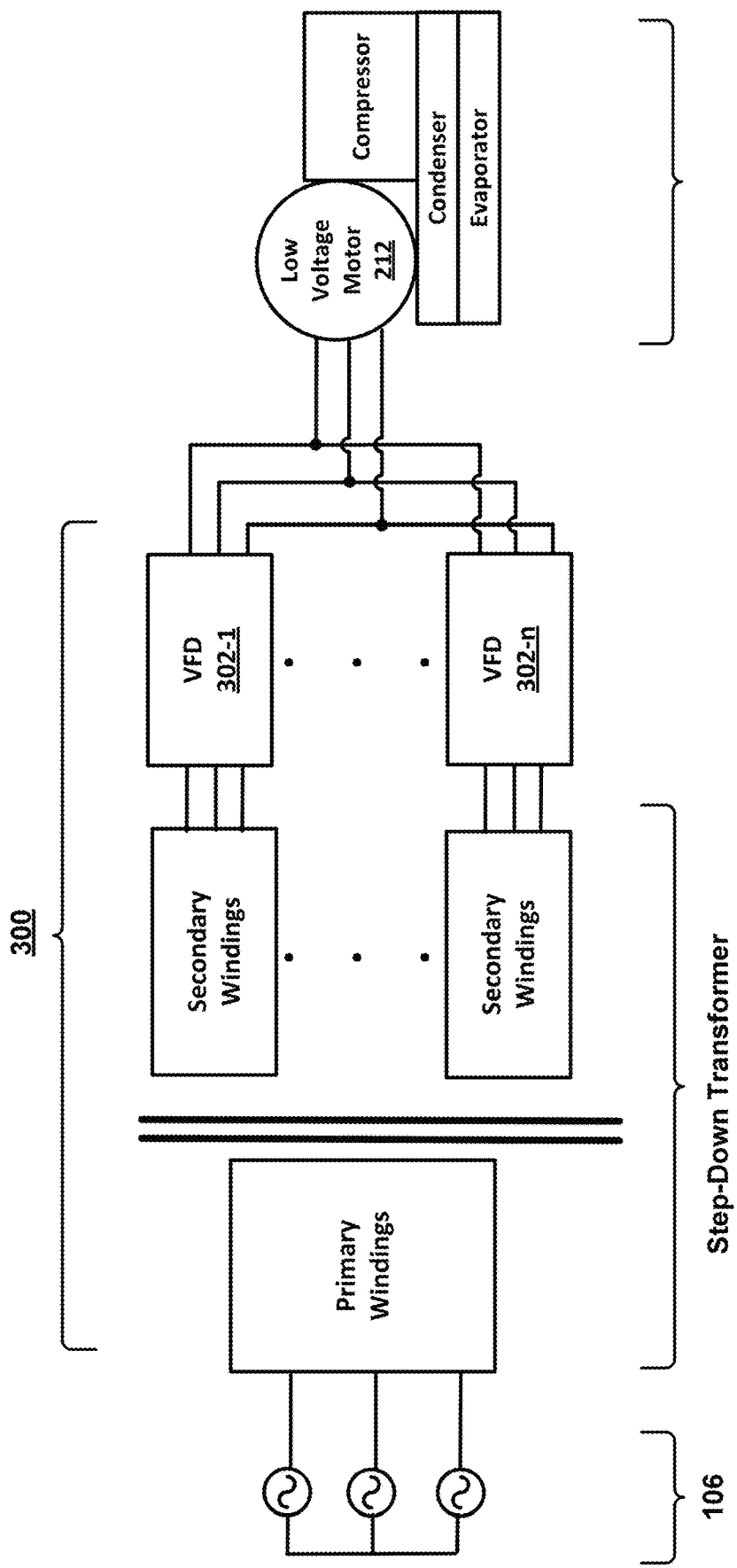
FIG. 3 is a block diagram of a variable frequency drive system with a medium voltage input and low voltage output.

FIG. 3 is a block diagram illustrating a VFD system 300 that is configured to address the foregoing problems described above and others. VFD system 300 has a three-phase medium-voltage input and a three-phase low-voltage output for driving a low-voltage AC motor 212 of HVAC system 204. The present disclosure is made with reference to three-phase low-voltage AC motors employed in industrial HVAC systems, it being understood the present disclosure should not be limited thereto.

System 300 includes a plurality of three-phase low-voltage VFDs 302 connected in parallel, the combination of which is connected to the AC motor 212 of HVAC system 204, and a step-down transformer that includes a plurality of three-phase outputs as shown. The step-down transformer is configured to transform a three-phase medium-voltage provided by feed 106 into a plurality of three-phase, symmetrically phase-shifted, low-voltage outputs. Each of the plurality of outputs of the step-down transformer provides a three-phase low-voltage (e.g., 460 V) voltage to a respective VFD 302. VFDs 302 can supply the same power to AC motor 212 as VFD 202 shown in FIG. 2. However, power is distributed in parallel through VFDs 302 to AC motor 212. All factors being equal, the power transmitted to AC motor 212 by each VFD 302 is substantially lower than the power transmitted by VFD 202.

The step-down transformer includes a set of primary windings and a plurality of sets of secondary windings. The sets of secondary windings are configured to symmetrically phase shift the three-phase low voltage outputs provided to respective VFDs 302. The three-phase outputs of the secondary windings are phase shifted to create harmonic cancellation and thus reduce the total harmonic distortion of VFD system 300.

Figure 4:
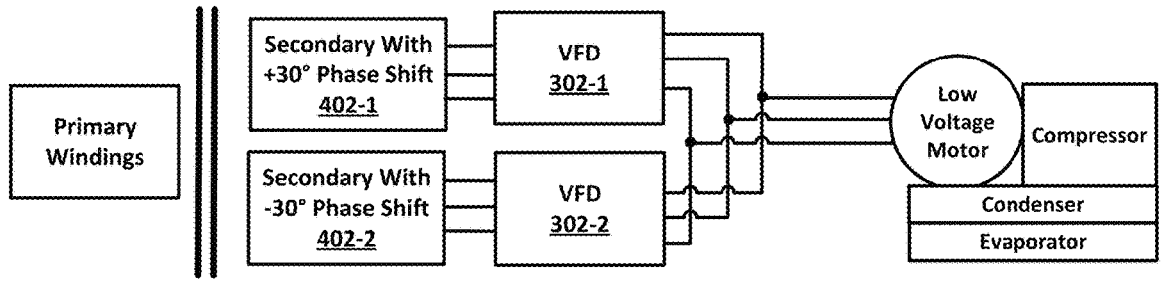
FIG. 4 is an example of the variable frequency drive system shown in FIG. 3, configured for 12 pulse input rectifier operation.
Figure 5:
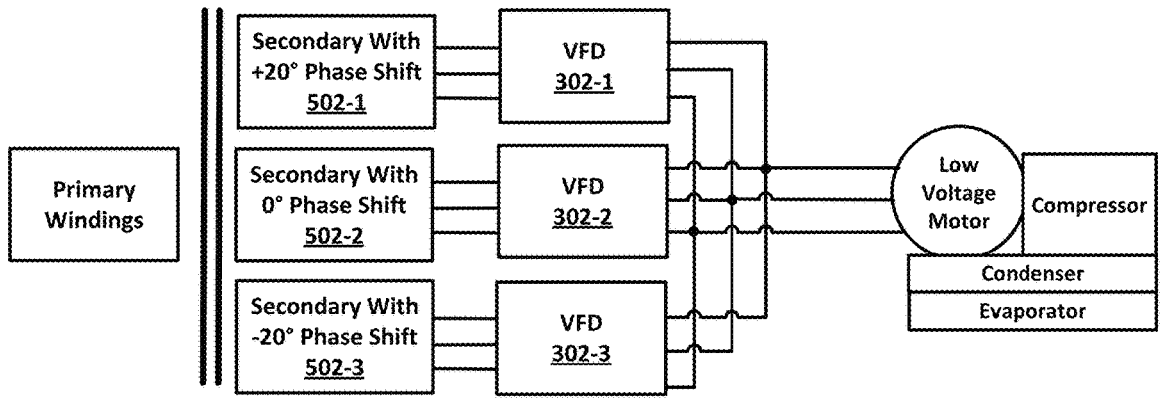
FIG. 5 is another example of the variable frequency drive system shown in FIG. 3, configured for 18 pulse input rectifier operation.
Figure 6:
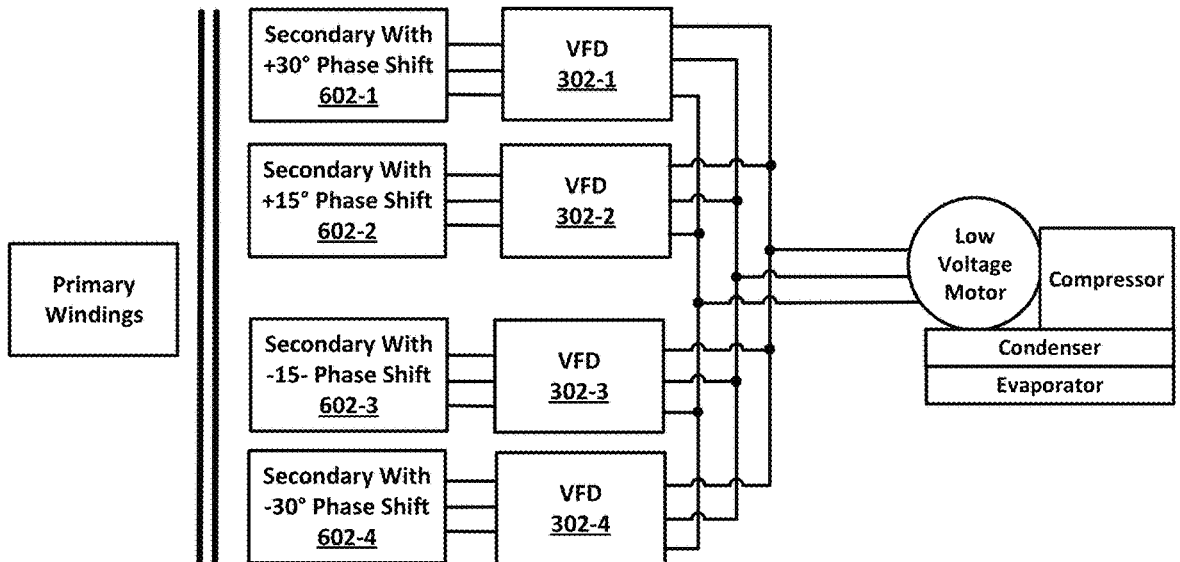
FIG. 6 is yet another example of the variable frequency drive system shown in FIG. 3, configured for 24 pulse input rectifier operation.

The amount of power required by AC motor 212 may vary from customer to customer. The number of secondary windings and corresponding VFDs 302 can be varied based upon the power requirements of the customer. FIGS. 4-6 illustrate examples of VFD system 300 that provide different levels of power to AC motor 212. FIG. 4 illustrates VFD system 300 with a pair of secondary windings 402 that provide two phase shifted outputs to respective VFDs 302. More specifically, the three-phase output of secondary winding 402-1 is phase shifted by +30° from that of the three-phase voltage input provided to the primary windings, and the three-phase output of secondary winding 402-2 is phase shifted by −30° from that of the three-phase voltage input provided to the primary windings. The 30 degree symmetrical phase shift results in 12 conduction pulses for each 360 degree electrical cycle. This is commonly referred to as a 12 pulse operation. FIG. 5 illustrates VFD system 300 with three secondary windings 502 that provide three phase shifted outputs to respective VFDs 302. More specifically, the three-phase output of secondary winding 502-1 is phase shifted by +20° from that of the three-phase voltage input provided to the primary windings, the three-phase output of secondary winding 402-2 is in phase (0° phase shift) with that of the three-phase voltage input provided to the primary windings, and the three-phase output of secondary winding 502-3 is phase shifted by −20° from that of the three-phase voltage input provided to the primary windings. The 20 degree symmetrical phase shift results in 18 conduction pulses for each 360 degree electrical cycle. This is commonly referred to as a 18 pulse operation. FIG. 6 illustrates VFD system with four secondary windings 602 that provide three-phase shifted outputs to respective VFDs 302. More specifically, three-phase output of secondary winding 602-1 is phase shifted by +30° from that of the three-phase voltage input provided to the primary windings, the three-phase output of secondary winding 602-2 is phase shifted by +15° from that of the three-phase voltage input provided to the primary windings, the three-phase output of secondary winding 602-3 is phase shifted by −15° from that of the three-phase voltage input provided the primary windings, and the three-phase output provided by secondary winding 602-4 is phase shifted −30° from that of the three-phase input to the primary windings. The 15 degree symmetrical phase shift results in 24 conduction pulses for each 360 degree electrical cycle. This is commonly referred to as a 24 pulse operation.

As will be more fully described, secondary windings can connected in a "zig-zag" configuration to introduce phase shifting. Zig-zag transformers use additional winding interconnections to create phase shifting properties. The term zig-zag is most often used for wye connection, but it can also be used to describe delta phase shifted configurations. Delta-zig-zag is also called delta-polygon connection.

Each VFD 302 provides a three-phase voltage with equal magnitude (e.g., 460 V) to low voltage motor 212. In other words, each of the VFD systems 300 shown within FIGS. 4-6 provide the same low-voltage input to low-voltage AC motor 212. VFD system 300 shown in FIG. 6, however, can provide more power than VFD system 300 shown in FIG. 5, which in turn can provide more power to low-voltage AC motor 212 than the VFD system 300 shown within FIG. 4, while also maintaining low harmonic distortion due to the symmetric phase shifting.

Figure 9:
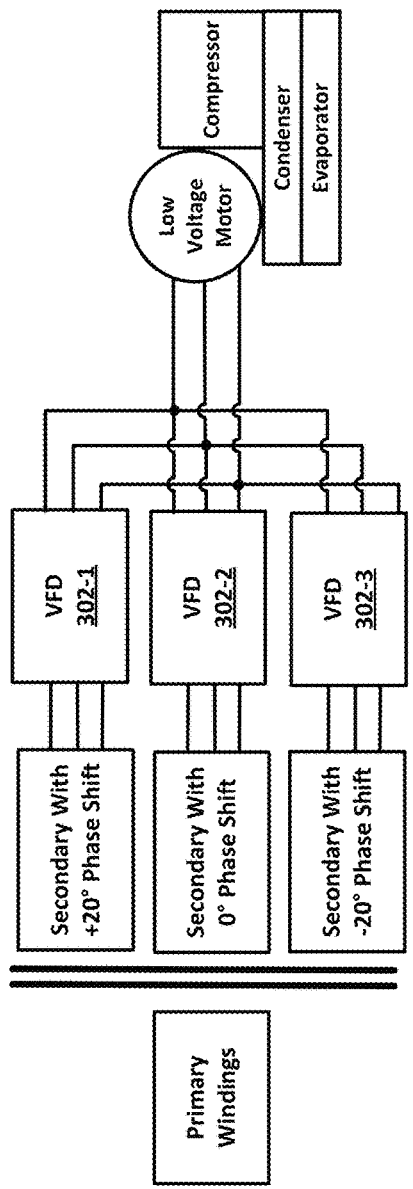
FIG. 9 is a schematic diagram of yet another example of the step-down transformer of FIG. 5, designed with delta connected primary windings and wye connected secondary windings.
Figure 9:
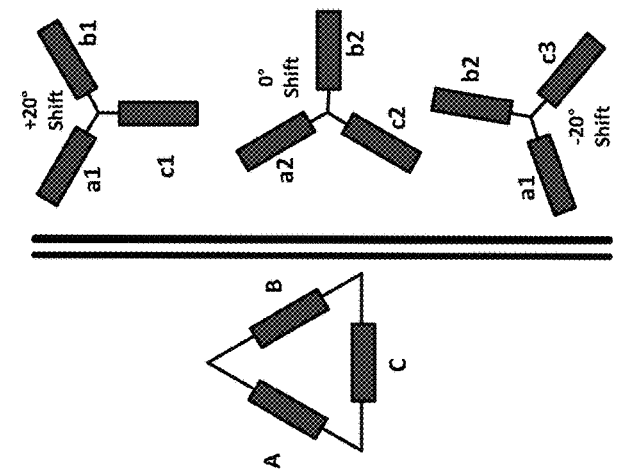
Figure 8:
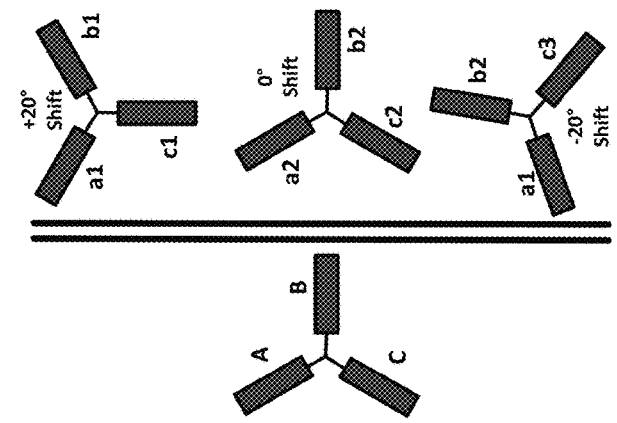
FIG. 8 is a schematic diagram of another example of the step-down transformer of FIG. 5, designed with wye connected primary windings and wye connected secondary windings.
Figure 7:
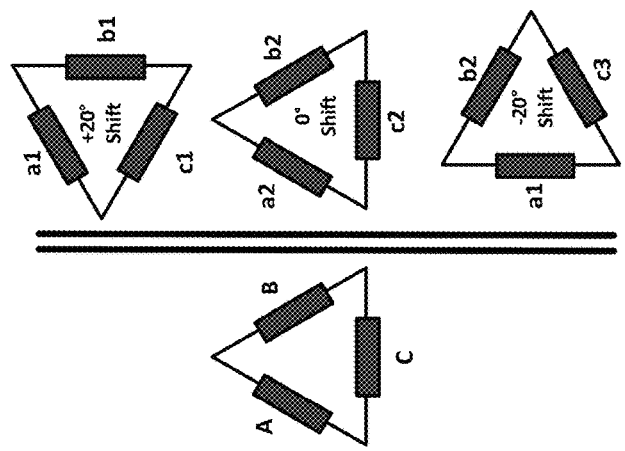
FIG. 7 is a schematic diagram of an example of the step-down transformer of FIG. 5, designed with delta connected primary windings and delta connected secondary windings.

The step-down transformers shown in FIGS. 4-6 may take many different configurations. FIGS. 7-9 illustrate three examples of the step-down transformer that can be employed in the system shown within FIG. 5. For convenience, the sheet that shows FIGS. 7-9 also show the VFD system 300 of FIG. 5. In FIGS. 7 and 9, primary windings A-C are connected in a "delta" configuration. In FIG. 8, the primary windings A-C are connected in a "wye" configuration. Secondary windings a1-c1, a2-c2, and a3-c3 in FIGS. 8 and 9 are connected in a wye configuration, while the secondary windings a1-c1, a2-c2, and a3-c3 in FIG. 7 are connected in a delta configuration. Other configurations are contemplated for both the primary and secondary windings. Although not clearly shown in FIGS. 7-9, secondary windings a1-c1, and a3-c3 are connected in zig-zag configuration to introduce phase shifts relative to each other and to windings a2-c2. Thus, secondary windings a1-c1 are connected to introduce a +20° phase shift with respect to three-phase output provided by the secondary windings a2-c2, and secondary windings a3-c3 are connected to introduce a −20° phase shift with respect to the phase shift provided by the secondary windings a2-c2.

Figure 10A:
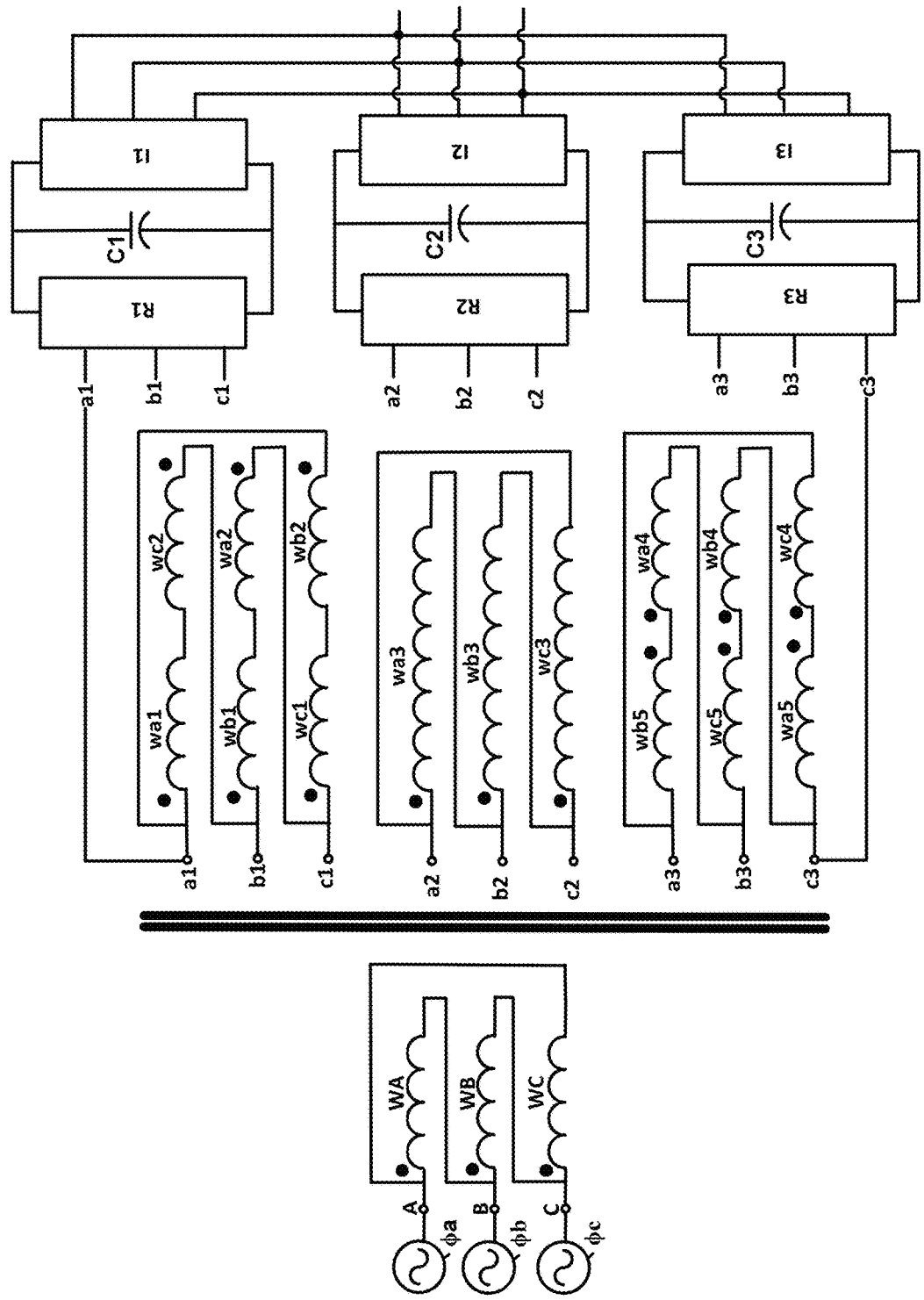
FIG. 10A is a schematic diagram of an example of the step-down transformer of FIG. 7.

As noted above, secondary windings of the step-down transformers introduce symmetrical phase shifts to reduce total harmonic distortion. Examples shown within FIGS. 7-9 introduce positive and negative 20° phase shifts with respect to the output of secondary windings a2-c2. FIG. 10A illustrates one embodiment of the connections in secondary windings a1-c1, a2-c2, and a3-c3 illustrated in FIG. 7. For ease of explanation and illustration, the terminals of the secondary windings a1-c1, a2-c2, and a3-c3 are also designated as a1-c1, a2-c2, and a3-c3.

Figure 10B:
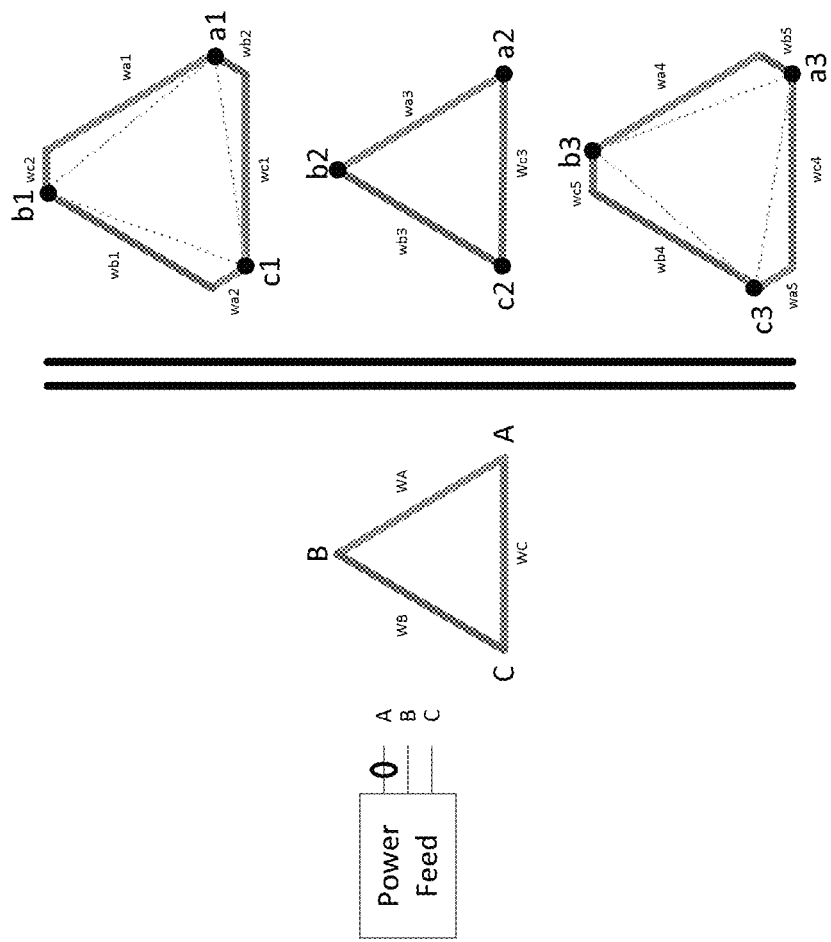
FIG. 10B is a phasor diagram that shows the relative phase angles between the secondary windings of the step-down transformer in FIG. 10A.
Figure 11:
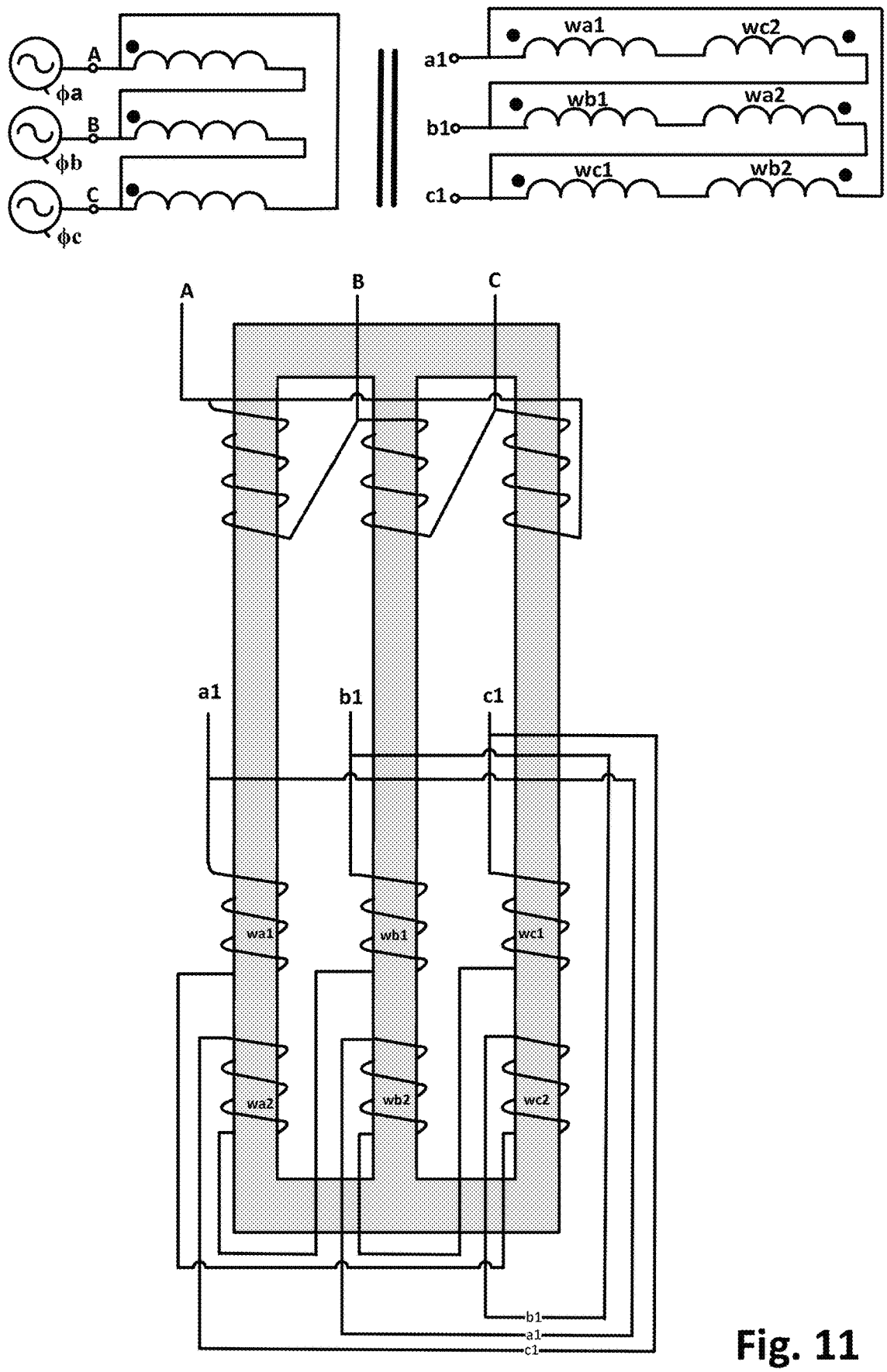
FIG. 11 is a partial schematic diagram of an example of the step-down transformer of FIG. 10.

As shown in FIG. 10, windings a1-c1, a2-c2, and a3-c3 are connected in the delta configuration. Windings a1-c1, and a3-c3, but not windings a2-c2, are connected in the "zig-zag" configuration. FIG. 11 illustrates an example step-down transformer that includes primary windings A-C arranged in a delta configuration, and one of the secondary windings (i.e., a1-c1) arranged in a delta zig-zag configuration. Secondary windings a2-c3 and a3-c3 are not shown in FIG. 11 to simplify the illustration.

FIGS. 10A and 11 show windings a1-c1 are subdivided into two parts. Winding a1 is subdivided into subwindings wa1 and wa2, each of which is in magnetic communication with primary winding A. For purposes of explanation only, windings that are in magnetic communication means windings that are wrapped around the same core. FIGS. 10A and 11 also show that winding b1 is divided into subwindings wb1 and wb2, each of which is a magnetic communication with primary winding B. Winding c1 is subdivided into subwindings wc1 and wc2, each of which is a magnetic communication with primary winding C.

FIG. 10A shows secondary windings a2-c2 are in magnetic communication with primary windings A-B, respectively. Each of windings a3-c3 are subdivided into two parts. Winding a3 is divided into subwindings wa4 and wa5, each of which is in magnetic communication with primary winding A. Winding b3 is divided into subwindings wb4 and wb5, each of which is a magnetic communication with primary winding B. Winding c3 is divided into subwindings wc4 and wc5, each of which is a magnetic communication with primary winding C. Windings a1-c1 are in magnetic communication with windings a2-c2, respectively, which in turn are in magnetic communication with windings a3-c3, respectively.

As noted above, windings a1-c1 and a3-c3 are connected in a zig-zag delta configuration to introduce +20° and −20° relative phase shifts. FIG. 10B is a phasor diagram that shows the relative phase angles between the secondary windings of the step-down transformer in FIG. 10A. With reference to FIGS. 10A and 10B, terminal a1 is fed by windings wa1 and wc2. Those two windings are separated by 120 degrees. The magnitude of voltage in each winding is chosen such that the vector combination of wa1 and wc2 adds up to the +20 degree phase shift compared to wa3. A similar thing is done for terminal a3, except that phase b is used to create negative phase shifting instead of phase c. Phase shifting relates to the ratio of turns in the subwindings. The example stepdown phase shifting transformer of FIGS. 10A and 11 demonstrates a 4160V primary and 460V secondary. The non-phase-shifted windings (wa3, wb3, wc3) use a turns ratio of 0.110 compared to the primary winding. The phase shifted windings include two sections. The longer sections (wa1, wb1, wc1, wa4, wb4, wc4) use a turns ratio of 0.082 compared to the primary winding. The shorter sections (wa2, wb2, wc2, wa5, wb5, wc5) use a turns ratio of 0.0437 compared to the primary winding.

Figure 12:
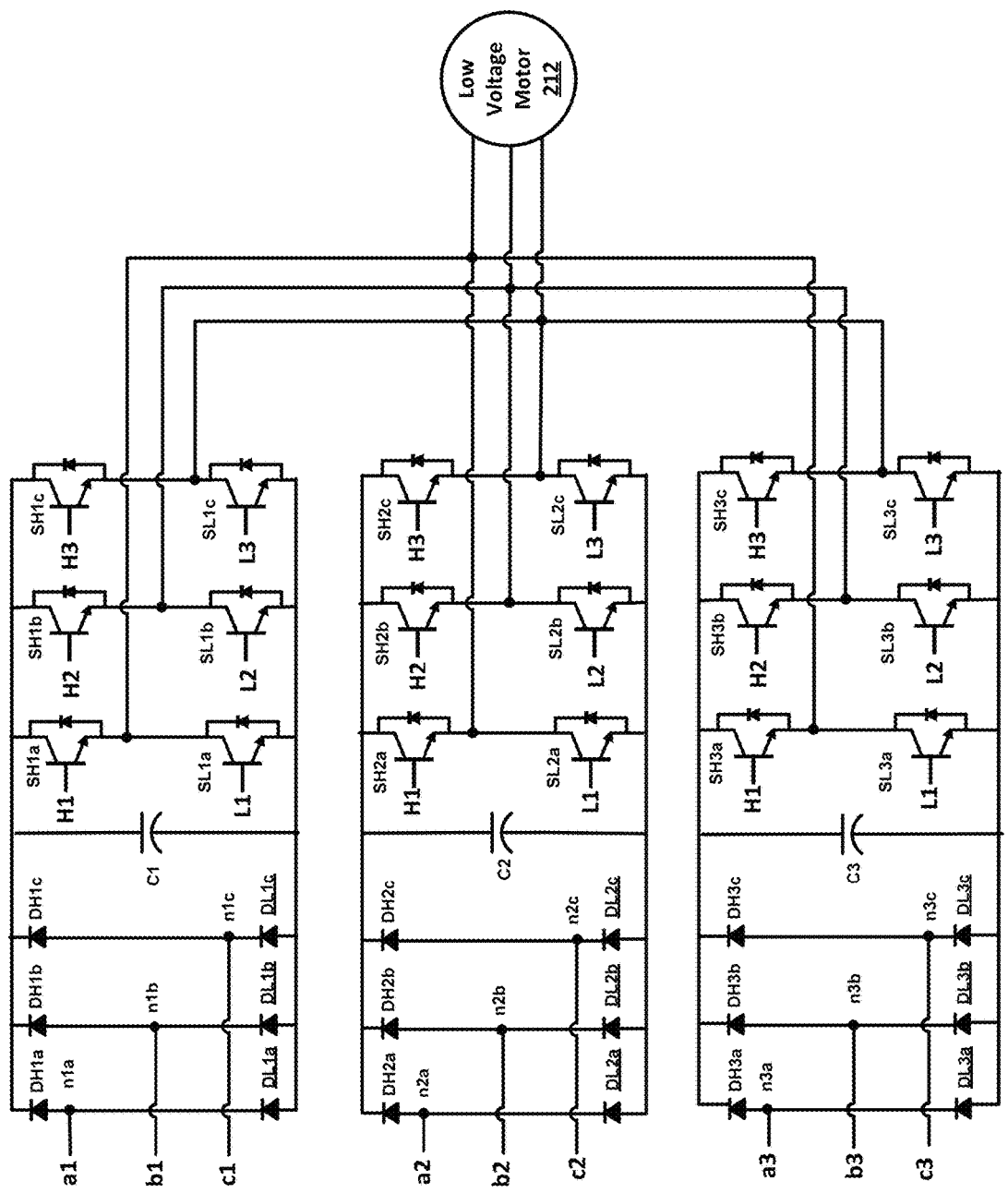
FIG. 12 is a schematic diagram of example variable frequency drives connected in parallel.

The outputs of the secondary windings of the example VFD systems 300 shown within FIGS. 4-6 are provided to inputs of respective VFDs 302. FIG. 10A shows example VFD system 300 of FIG. 5 with secondary windings a1-c1, a2-c2, and a3-c3 coupled to respective rectifiers of VFDs 302. More particularly, the output terminals of secondary winding a1-c1, which are also designated a1-c1, are connected to respective inputs of rectifier R1, the output terminals of secondary winding a2-c2, which are also designated a2-c2, are connected to respective inputs of rectifier R2, and the output terminals of secondary winding a3-c3, which are also designated a3-c3, are connected to respective inputs of R3. Rectifier R1-R3 are electrically connected to and provide DC power to inverters I1-I3, respectively. DC link capacitors C1-C3 are electrically connected between the rectifiers and inverters as shown. The outputs of the inverters are connected in parallel. The parallel connection point for multiple VFDs can be made at the motor terminals. Wire lengths from VFDs to motor should be equal. This length of wire introduces a small amount of inductance to help balance current sharing of parallel VFDs FIG. 12 illustrate example VFDs 302 connected in parallel, the combination of which is connected in series between respective secondary windings a1-c1, a2-c2, and a3-c3 (not shown) and the low-voltage motor 212. Each VFD 302 includes a DC link capacitor connected between a rectifier R and an inverter I. Each phase of rectifier R includes a high-side diode DH connected to a low-side diode DL. Each phase of inverter I includes a high-side switch SH connected to a low-side switch SL. In the illustrated example, each high-side switch SH includes an insulated-gate bipolar transistor (IGBT) connected in parallel with diode DHx, and each low-side switch includes an IGBT connected in parallel with diode. Alternative switches such as MOSFETs are contemplated.

High-side switches SH are connected in series with low-side switches SL, respectively, which in turn are connected to respective terminals of motor 212. The collectors of high-side switches SH SL are connected are connected to a V− input terminal of rectifier R. DC voltage Vdc is received between the V+ and V− input terminals from rectifier R.

High-side switches SH and low-side switches SL are controlled by a microcontroller (or other similar data processing device) through respective gate drivers (not shown). A gate driver is a circuit that accepts a low-power input signal from a device (e.g., a microcontroller) and produces a corresponding high-current output signal needed to control the gate of a power switch.

Control of the inverters is relatively simple. High-side switches SH1-SH3 of each inverter I receive respective control signals (e.g., pulse width modulation signals) H1-H3, and low-side switches SL1-SL3 of each inverter I receive respective control signals (e.g., pulse width modulation signals) L1-L3 from a microcontroller or similar device. The microcontroller activates high-side switches SH1-SH3 by asserting control signals H1-H3, respectively, and the microcontroller activates low-side switches SL1-SL3 by asserting by asserting control signals L1-L3, respectively. Each of the switches SH1-SH3 and SL1-SL3 conducts current to or from motor 212 when activated. As explained above and reiterated below, the present disclosure includes, without limitation, the following example implementations.

Clause 1. An apparatus comprising a transformer comprising a set of input terminals, a first set of output terminals, and a second set of output terminals; first and second rectifiers coupled to the first and second sets of output terminals, respectively; wherein the transformer is configured to transform three phase alternating current (AC) provided to the set of input terminals into first and second three phase AC outputs at the first and second sets of output terminals, respectively; wherein the first three phase AC output is phase shifted from the second three phase AC output.

Clause 2. The apparatus of the proceeding clause further comprising a third rectifier; wherein the transformer comprises a third set of output terminals coupled to the third rectifier; wherein the transformer is configured to transform the three phase alternating current AC provided to the set of input terminals into the first three phase AC output at the first set of output terminals, the second three phase AC output at the second set of output terminals, and a third three phase AC output at the third set of output terminals; wherein the third three phase AC output is phase shifted from the first and second three phase AC outputs.

Clause 3. The apparatus of any of the preceding clauses wherein the first three phase AC output leads the second three phase AC output, and the third three phase AC output lags the second three phase AC output.

Clause 4. The apparatus of any of the preceding clauses wherein the first three phase AC output leads the second three phase AC output by 20 degrees, and the third three phase AC output lags the second three phase AC output by 20 degrees.

Clause 5. The apparatus of any of the preceding clauses wherein an amount by which the first three phase AC output leads the second three phase AC output is substantially equal to an amount by which the third AC output lags the second three phase AC output.

Clause 6. The apparatus of claim 2 further comprising first, second, and third inverters coupled to the first, second, and third rectifiers, respectively.

Clause 7. The apparatus of any of the preceding clauses further comprising a low-voltage electric motor coupled to the first, second, and third inverters.

Clause 8. The apparatus of any of the preceding clauses further comprising a low-voltage electrical motor coupled to the first, second, and third rectifiers.

Clause 9. The apparatus of any of the preceding clauses wherein the transformer comprises: a set of primary windings; first, second, and third sets of secondary windings; wherein the first and third sets, but not the second set, of secondary windings are arranged in a zigzag configuration.

Clause 10. The apparatus of any of the preceding clauses wherein each of the first and third sets of secondary windings are arranged in a delta zigzag configuration.

Clause 11. Another apparatus comprises first, second and third rectifiers comprising first, second, and third sets of input terminals, respectively, and first, second, and third direct current (DC) output terminals, respectively; first, second, and third inverters comprising first, second, and third DC input terminals electrically connected to the first, second, and third DC output terminals, respectively, and first, second, and third sets of output terminals, respectively; an electric motor electrically connected to the first, second, and third sets of output terminals of the first, second, and third inverters, respectively.

Clause 12. The apparatus of the preceding clause wherein each of the first, second, and third rectifiers is a passive rectifier.

Clause 13. The apparatus of any of the preceding clauses further comprising: a transformer comprising a set of input terminals, a first set of output terminals, a second set of output terminals, and a third set of output terminals; wherein the first set of output terminals of the transformer are electrically connected to the first set of input terminals of the first rectifier; wherein the second set of output terminals of the transformer are electrically connected to the second set of input terminals of the second rectifier; wherein the third set of output terminals of the transformer are electrically connected to the third set of input terminals of the third rectifier.

Clause 14. The apparatus of any of the preceding clauses wherein the transformer is configured to transform a three phase alternating current (AC) provided to the set of input terminals of the transformer into first, second, and third three phase AC outputs at the first, second, and sets of output terminals, respectively, of the transformer.

Clause 15. The apparatus of any of the preceding clauses wherein the first three phase AC output is phase shifted from the second three phase AC output, and wherein the third three phase AC output is phase shifted from the second three phase AC output.

Clause 16. The apparatus of any of the preceding clauses wherein the first three phase AC output leads the second three phase AC output, and the third three phase AC output lags the second three phase AC output.

Clause 17. The apparatus of any of the preceding clauses wherein the first three phase AC output leads the second three phase AC output by 20 degrees, and the third three phase AC output lags the second three phase AC output by 20 degrees.

Clause 18. The apparatus of any of the preceding clauses wherein an amount by which the first three phase AC output leads the second three phase AC output is substantially equal to an amount by which the third AC output lags the second three phase AC output.

Clause 19. The apparatus of any of the preceding clauses wherein the transformer comprises: a set of primary windings; first, second, and third sets of secondary windings; wherein the first and third sets, but not the second set, of secondary windings are arranged in a zigzag configuration.

Clause 20. The apparatus of any of the preceding clauses comprising a three-phase motor with three phase input terminals connected to respective three phase output terminals of the first, second, and third inverters by electrical conductors of equal length.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An apparatus comprising:
   a transformer comprising a set of input terminals, a first set of output terminals, and a second set of output terminals;
   first and second rectifiers coupled to the first and second sets of output terminals, respectively;
   wherein the transformer is configured to transform three phase alternating current (AC) provided to the set of input terminals into first and second three phase AC outputs at the first and second sets of output terminals, respectively;
   wherein the first three phase AC output is phase shifted from the second three phase AC output; and
   wherein the transformer comprises:
      a set of primary windings;
      a first set of secondary windings and a second set of secondary windings; and
      wherein the first set of secondary windings but not the second set of secondary windings is arranged in a zigzag configuration.

2. The apparatus of claim 1 further comprising:
   a third rectifier;
   wherein the transformer comprises a third set of output terminals coupled to the third rectifier;
   wherein the transformer is configured to transform the three phase alternating current AC provided to the set of input terminals into the first three phase AC output at the first set of output terminals, the second three phase AC output at the second set of output terminals, and a third three phase AC output at the third set of output terminals;
   wherein the third three phase AC output is phase shifted from the first and second three phase AC outputs.

3. The apparatus of claim 2 wherein the first three phase AC output leads the second three phase AC output, and the third three phase AC output lags the second three phase AC output.

4. The apparatus of claim 3 wherein the first three phase AC output leads the second three phase AC output by 20 degrees, and the third three phase AC output lags the second three phase AC output by 20 degrees.

5. The apparatus of claim 4 wherein an amount by which the first three phase AC output leads the second three phase AC output is substantially equal to an amount by which the third AC output lags the second three phase AC output.

6. The apparatus of claim 2 further comprising first, second, and third inverters coupled to the first, second, and third rectifiers, respectively.

7. The apparatus of claim 6 further comprising a low-voltage electric motor coupled to the first, second, and third inverters.

8. The apparatus of claim 2 further comprising a low-voltage electrical motor coupled to the first, second, and third rectifiers.

9. The apparatus of claim 2 wherein the transformer comprises:
   a third set of secondary windings; and
   wherein the third set of secondary windings is arranged in a zigzag configuration.

10. The apparatus of claim 9 wherein each of the first and third sets of secondary windings are arranged in a delta zigzag configuration.

11. An apparatus comprising:
    first, second and third rectifiers comprising first, second, and third sets of input terminals, respectively, and first, second, and third direct current (DC) output terminals, respectively;
    first, second, and third inverters comprising first, second, and third DC input terminals electrically connected to the first, second, and third DC output terminals, respectively, and first, second, and third sets of output terminals, respectively;
    an electric motor electrically connected to the first, second, and third sets of output terminals of the first, second, and third inverters, respectively; and
    a transformer electrically connected to the first, second, and third rectifiers, wherein the transformer comprises:
       a set of primary windings;
       a first set of secondary windings and a second set of secondary windings; and
       wherein the first set of secondary windings but not the second set of secondary windings is arranged in a zigzag configuration.

12. The apparatus of claim 11 wherein each of the first, second, and third rectifiers is a passive rectifier.

13. The apparatus of claim 11 wherein:
the transformer comprises a set of input terminals, a first set of output terminals, a second set of output terminals, and a third set of output terminals;
wherein the first set of output terminals of the transformer are electrically connected to the first set of input terminals of the first rectifier;
wherein the second set of output terminals of the transformer are electrically connected to the second set of input terminals of the second rectifier; and
wherein the third set of output terminals of the transformer are electrically connected to the third set of input terminals of the third rectifier.

14. The apparatus of claim 13 wherein the transformer is configured to transform a three phase alternating current (AC) provided to the set of input terminals of the transformer into first, second, and third three phase AC outputs at the first, second, and sets of output terminals, respectively, of the transformer.

15. The apparatus of claim 14 wherein the first three phase AC output is phase shifted from the second three phase AC output, and wherein the third three phase AC output is phase shifted from the second three phase AC output.

16. The apparatus of claim 14 wherein the first three phase AC output leads the second three phase AC output, and the third three phase AC output lags the second three phase AC output.

17. The apparatus of claim 16 wherein the first three phase AC output leads the second three phase AC output by 20 degrees, and the third three phase AC output lags the second three phase AC output by 20 degrees.

18. The apparatus of claim 17 wherein an amount by which the first three phase AC output leads the second three phase AC output is substantially equal to an amount by which the third AC output lags the second three phase AC output.

19. The apparatus of claim 13 wherein the transformer comprises:
a third set of secondary windings; and
wherein the third set of secondary windings is arranged in a zigzag configuration.

20. The apparatus of claim 19 further comprising a three-phase motor with three phase input terminals connected to respective three phase output terminals of the first, second, and third inverters by electrical conductors of equal length.

* * * * *